US010878680B2

(12) United States Patent
Ball

(10) Patent No.: US 10,878,680 B2
(45) Date of Patent: Dec. 29, 2020

(54) AUTOMATED CONTAINER KIOSK

(71) Applicant: Kevin Ball, Idaho Falls, ID (US)

(72) Inventor: Kevin Ball, Idaho Falls, ID (US)

( * ) Notice: Subject to any disclaimer, the term of this patent is extended or adjusted under 35 U.S.C. 154(b) by 0 days.

(21) Appl. No.: 16/269,519

(22) Filed: Feb. 6, 2019

(65) Prior Publication Data

US 2020/0250948 A1 Aug. 6, 2020

(51) Int. Cl.
*G08B 13/24* (2006.01)
*G07C 9/00* (2020.01)
*G06Q 20/40* (2012.01)
*G05D 23/19* (2006.01)

(52) U.S. Cl.
CPC ....... *G08B 13/248* (2013.01); *G05D 23/1932* (2013.01); *G06Q 20/401* (2013.01); *G07C 9/00309* (2013.01); *G07C 2009/0042* (2013.01); *G07C 2009/00539* (2013.01)

(58) Field of Classification Search
None
See application file for complete search history.

(56) References Cited

U.S. PATENT DOCUMENTS

| | | | | |
|---|---|---|---|---|
| 2004/0117274 A1* | 6/2004 | Cenedese | ............. | G06Q 10/087 705/28 |
| 2005/0044906 A1* | 3/2005 | Spielman | ........... | G07C 9/00166 70/63 |
| 2005/0165612 A1* | 7/2005 | Van Rysselberghe | ....................... G07F 17/12 | 705/26.1 |
| 2009/0306820 A1* | 12/2009 | Simmons | ................ | G07F 9/026 700/244 |
| 2013/0033222 A1* | 2/2013 | Hixson | ................. | E04H 1/1211 320/101 |
| 2014/0222603 A1* | 8/2014 | Hay | ........................ | G06Q 20/18 705/23 |
| 2014/0272049 A1* | 9/2014 | Azzano | ............... | A47J 31/4403 426/433 |
| 2014/0292476 A1* | 10/2014 | Thompson | ......... | G07C 9/00896 340/5.7 |
| 2017/0288879 A1* | 10/2017 | Quinlan | ................. | G06F 21/31 |

(Continued)

OTHER PUBLICATIONS

Machkovech, Sam, "Next to Bezo's Balls-Amazon Go debuts, and its prying cameras fil our shoplifiting attempts.", Ars Technica Addendum, Wired Media Group (Year: 2018).*

(Continued)

*Primary Examiner* — Nabil H Syed
*Assistant Examiner* — Cal J Eustaquio
(74) *Attorney, Agent, or Firm* — Kunzler Bean & Adamson, PC

(57) ABSTRACT

Apparatuses, methods, systems, and program products are disclosed for an automated container kiosk. An apparatus includes a request module configured to receive a request over a data network to unlock a door of a container. An apparatus includes a payment module configured to determine whether one or more payment conditions is satisfied for one or more items within a container. An apparatus includes a security module configured to, in response to determining that one or more payment conditions is satisfied, receive unlock information for unlocking a door of a container and enable one or more security measures for monitoring activity within the container.

16 Claims, 6 Drawing Sheets

(56) References Cited

U.S. PATENT DOCUMENTS

2018/0174125 A1* 6/2018 Mao .................. G07F 11/42

OTHER PUBLICATIONS

Santosh, K et al., "Automated Package Delivery Accepting System-Smart Freight Box," 2019 4th International Conference on Recent Trends on Electronics,Information, Communication & Technology (RTEICT-2019), May 17 and 18, 2019, 1510-1514 (Year: 2019).*
Coldewey, D., "Inside Amazon's surveillance-powered, no-checkout convenience store," Techcrunch, Jan. 21, 2018 (Year: 2018).*
Shepard, S, "The Security of Amazon Go," Jan. 23, 2018, Security Today (Year: 2018).*

* cited by examiner

AUTOMATED CONTAINER KIOSK

FIELD

This invention relates to kiosks and more particularly relates to an automated container kiosk.

BACKGROUND

In order to purchase products, consumers may be required to go to a retail store and be assisted by employees. Kiosks can be used to provide self-service means to purchase products without the need of a retail store or employees.

SUMMARY

An apparatus for an automated container kiosk is disclosed. A system and method also perform the functions of the apparatus. In one embodiment, an apparatus includes a request module configured to receive a request over a data network to unlock a door of a container. In certain embodiments, an apparatus includes a payment module configured to determine whether one or more payment conditions is satisfied for one or more items within a container. In various embodiments, an apparatus includes a security module configured to, in response to determining that one or more payment conditions is satisfied, receive unlock information for unlocking a door of a container and enable one or more security measures for monitoring activity within the container. In some embodiments, modules comprise one or more of hardware circuits, programmable hardware devices, and a processor executing code.

A container for an automated container kiosk is disclosed. In one embodiment, a container includes a door that is operably coupled to a container and comprising a locking mechanism configured to selectively allow unsupervised access to an inside of the container. In further embodiments, a container includes a controller that is configured to receive a request over a data network to unlock a door of a container, determine whether one or more payment conditions is satisfied for one or more items within the container, and in response to determining that the one or more payment conditions is satisfied, receive unlock information for unlocking the locking mechanism and enable one or more security measures for monitoring activity within the container.

A method for an automated container kiosk is disclosed. In one embodiment, a method includes receiving a request over a data network to unlock the door of the container. In certain embodiments, a method includes determining whether one or more payment conditions is satisfied for one or more items within a container. In some embodiments, a method includes, in response to determining that the one or more payment conditions is satisfied, receiving unlock information for unlocking a door of a container and enabling one or more security measures for monitoring activity within the container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
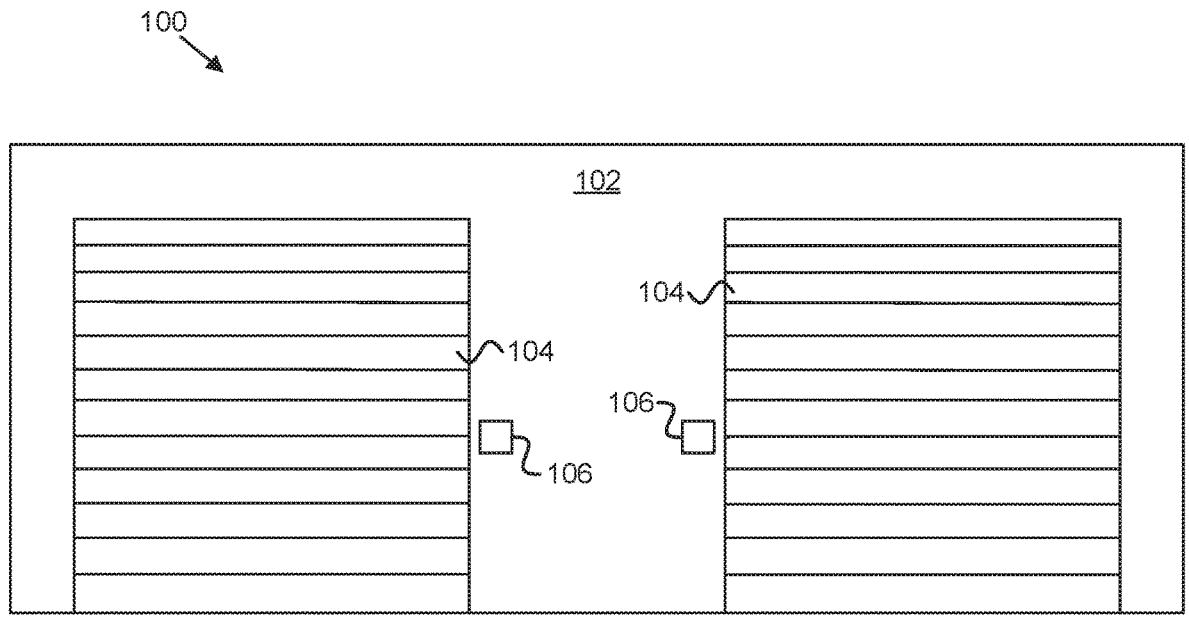
FIG. 1A is a perspective view illustrating one embodiment of a container for an automated container kiosk.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

An apparatus for an automated container kiosk is disclosed. A system and method also perform the functions of the apparatus. In one embodiment, an apparatus includes a request module configured to receive a request over a data network to unlock a door of a container. In certain embodiments, an apparatus includes a payment module configured to determine whether one or more payment conditions is satisfied for one or more items within a container. In various embodiments, an apparatus includes a security module configured to, in response to determining that one or more payment conditions is satisfied, receive unlock information for unlocking a door of a container and enable one or more security measures for monitoring activity within the container. In some embodiments, modules comprise one or more of hardware circuits, programmable hardware devices, and a processor executing code.

In one embodiment, the one or more security measures comprises turning on one or more cameras and lights within the container. In certain embodiments, the security module is further configured to enable one or more cameras and lights located on an external surface of the container in response to detecting a user's proximity to the container. In some embodiments, the security module is further configured to one or more of send a notification and provide a live video feed of an interior of the container in response to a user accessing the interior of the container.

In various embodiments, the security module is further configured to automatically unlock and open the door in response to receiving the unlock information for unlocking the door and automatically close the door after detecting a period of time without activity within the container. In one embodiment, the apparatus includes a theft module configured to detect one or more items that are taken from the container that have not been purchased.

In one embodiment, the theft module detects the one or more items that are taken from the container that have not been purchased by one or more of processing images of items taken from the container, scanning items as they are removed from the container, and using one or more weight sensors to determine the weight of the container before and after the items are removed from the container. In certain embodiments, the theft module is further configured to send an alarm in response to detecting the one or more items that are taken from the container that have not been purchased.

In one embodiment, the payment module receives payment for one or more items within the container via one or more of a mobile application, an automated phone payment system, and a kiosk located at the container. In certain embodiments, the unlock information comprises an unlock code for a digital lock that is used to lock the door. In various embodiments, the security module is further configured to automatically unlock the door using the unlock code in response to receiving the unlock code. In some embodiments, the unlock code comprises a one-time use unlock code such that the unlock code is not valid after it is used to unlock the door.

A container for an automated container kiosk is disclosed. In one embodiment, a container includes a door that is operably coupled to a container and comprising a locking mechanism configured to selectively allow unsupervised access to an inside of the container. In further embodiments, a container includes a controller that is configured to receive a request over a data network to unlock a door of a container, determine whether one or more payment conditions is satisfied for one or more items within the container, and in response to determining that the one or more payment conditions is satisfied, receive unlock information for unlocking the locking mechanism and enable one or more security measures for monitoring activity within the container.

In one embodiment, the container includes a climate control system that is configured to communicate with the controller to maintain one or more climate settings within the container. The climate settings may be determined based on a type of items within the container. In some embodiments, the climate control system comprises a heating, ventilation, and air conditioning ("HVAC") system for controlling a temperature of the interior of the container. The temperature may be determined based on the type of items within the container. In one embodiment, the climate control system further comprises one or more moisture components for generating humidity and providing moisture to one or items within the container.

In certain embodiments, the container includes a power system that includes one or more solar panels and batteries for powering different components of the container. In various embodiments, the container includes a wireless communication system that includes one or more of satellite components, cellular components, and Wi-Fi components for wirelessly communicating information to a remote device. In some embodiments, the one or more items within the container comprise vegetation, the vegetation comprising one or more of plants, sod, flowers, bushes, and trees.

A method for an automated container kiosk is disclosed. In one embodiment, a method includes receiving a request over a data network to unlock the door of the container. In certain embodiments, a method includes determining whether one or more payment conditions is satisfied for one or more items within a container. In some embodiments, a method includes, in response to determining that the one or more payment conditions is satisfied, receiving unlock information for unlocking a door of a container and enabling one or more security measures for monitoring activity within the container.

FIG. 1A is a perspective view illustrating one embodiment of a container system 100 for an automated container kiosk. The container system 100, as described herein, provides for unsupervised payment and access to items within the container 102. The container 102 may be placed in a location that allows users to approach the container 102, provide credentials, payment information, or the like, and access and remove items within the container 102 that the user has purchased. The container 102, as described in more detail below, may be self-contained such that it does require hook-ups to external utilities to function, and includes various security measures for monitoring and reporting activities outside and within the container 102. In this manner, the container 102 can be placed in a remote location or in an urban setting, and does not require an owner, employee, manager, or other person to supervise the container(s) 102.

In one embodiment, the container system 100 includes a container 102. The container 102 may be a shipping container (e.g., a CONEX box), a semi-trailer, or another container that is water-proof, wind-proof, sturdy, and rigid. In certain embodiments, the container 102 is insulated to help maintain a temperature or temperature range within the container. A container 102 as described herein may have various dimensions, e.g., lengths, heights, depths. The container 102 may be fixed at a location, may be configured to be mobile (e.g., on a trailer that can be towed), or the like, and may be hooked-up to utilities such as water, power, gas, etc.

In one embodiment, the container 102 may include one or more doors 104 that provide access to the interior of the container 102 through one or more corresponding entryways. The doors 104 may be located on the long side of the container 102 and/or the short side of the container 102. For instance, a container 102 that has a length of forty feet may include three doors 104 along the long side of the container 102. Each door 104 may be wide and tall enough for a standard pallet of items to fit through the door 104. Thus, with a forty-foot container 102, two doors 104 may each be fourteen feet wide and a third door 104 may be ten feet wide, with each door being seven feet high. In another example, a container 102 that is twenty-feet wide may have two doors 104 along the long side of the container 102 that are each nine feet wide and seven feet tall. Other configurations and dimensions may be used and will be recognizable to one of skill in the art in light of this disclosure, e.g., doors 104 at the short side of the container 102, windows, etc.

In one embodiment, the container 102 includes a locking mechanism 106 for each door 104. The locking mechanism 106 may include a padlock, a combination lock, and/or the like. In other embodiments, the locking mechanism 106 includes a smart lock, which is designed to perform locking and unlocking operations on a door 104 when it receives such instructions from a device using a wireless protocol, e.g., Bluetooth®, near-field communication ("NFC"), or the like, and a cryptographic key or code to execute the authorization process. It may also monitor access and send alerts for the different events it monitors, such as locking and unlocking events, and other critical events related to the status of the device, e.g., low battery, malfunction, etc.

For instance, a device such as a smart phone may communicate with the smart lock using a Bluetooth® connection to provide a code, a password, a combination, a pass phrase, or the like to the smart lock to actuate the locking mechanism 106 to lock or unlock the smart lock. In certain embodiments, the locking mechanism 106 may comprise a digital or physical keypad where a user can enter a code, a combination, or the like to actuate (e.g., lock/unlock) the locking mechanism 106. The locking mechanism 106 may be located on the door 104, on the container 102 proximate to the door 104, or the like.

Figure 1B:
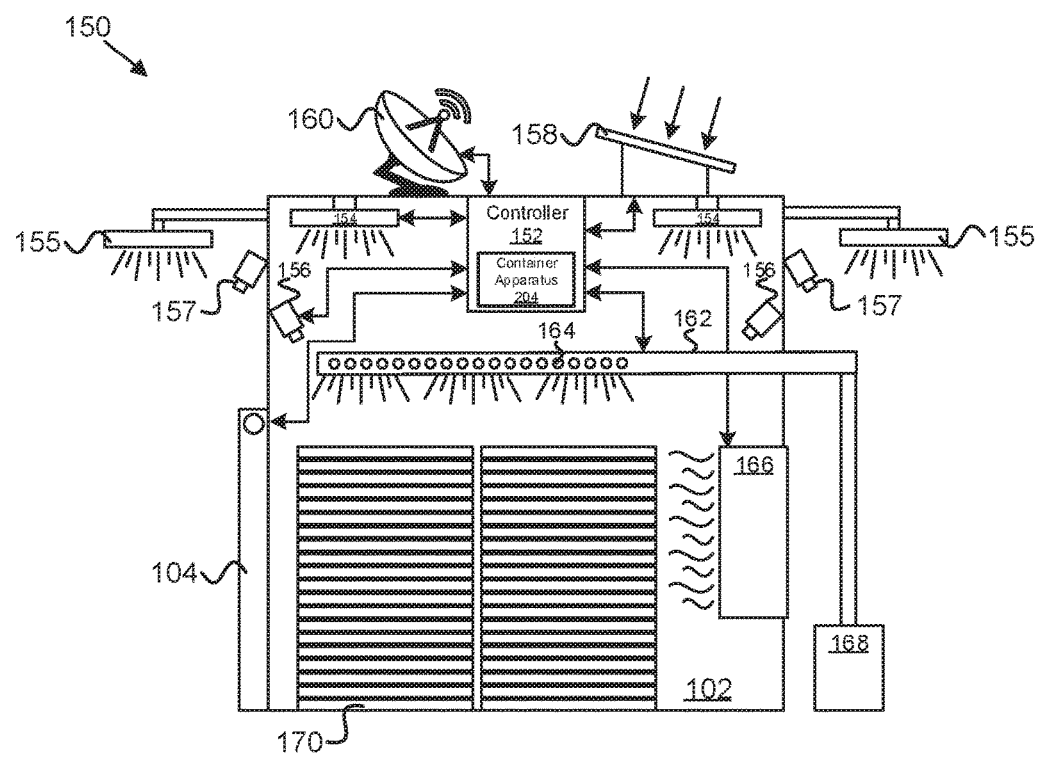
FIG. 1B is a perspective cut-away view illustrating another embodiment of a container for an automated container kiosk.

FIG. 1B is a perspective cut-away view illustrating another embodiment of a container 102 for an automated container kiosk. In one embodiment, the container 102 includes a controller 152 that is configured to control, command, monitor, and/or the like the actions of various systems, components, parts, or the like of the container 102. The controller 152 may be a computing device, an integrated circuit device, an FPGA or ASIC device, and/or the like. In one embodiment, the controller 152 is operably connected to one or more interior lights 154. The interior lights 154 may be configured to illuminate the interior of the container 102. Furthermore, the controller 152 may be operable coupled to one or more interior cameras 156 that are configured to capture images, video, audio, and/or the like of the interior of the container 102.

In some embodiments, the container 102 includes one or more exterior lights 155 for illuminating an exterior of the container 102 and/or one or more exterior cameras 157 for capturing images, video, audio, and/or the like of the exterior of the container 102. In certain embodiments, the container 102 includes a climate control system that the controller 152 controls for maintaining various climate settings within the container 102. The settings may be based on the types of items 170 in the container 102. For instance, the climate control system may set the container to be warmer and more humid if vegetation is stored in the container 102 as opposed to clothing or electronics, which may require a dryer, less humid climate.

The climate control system may include a moisture/humidity system 162 that include a plurality of sprinklers 164, drippers, or the like that are configured to provide moisture to items 170 within the container 102. In such an embodiment, the items 170 may include vegetation such as sod, plants, flowers, bushes, trees, shrubs, and/or the like. Other items may include produce such as vegetables, fruits, etc. The moisture system 162 may be hooked-up to a continuous water source (e.g., a city-water hook-up) and/or may include a refillable water tank 168 that can act as the primary or secondary source of water (so that the container 102 can be placed at a location that does not include water hook-ups). Various different types and sizes of items may be placed in the container 102 (e.g., clothes, electronics, furniture, etc.), not just vegetation, as one of skill in the art will recognize in light of this disclosure.

The climate control system, in some embodiments, is operably coupled to a heating, ventilation, and air conditioning ("HVAC") unit 166 that is configured to maintain a temperature within the container 102. The moisture/humidity system 162 and/or the HVAC unit 166 may be remotely controllable. For instance, the moisture/humidity system 162 and/or the HVAC unit 166 may be smart devices, or coupled to smart devices (e.g., a smart thermostat) such that a user, owner, manager, or the like can remotely control the amount of humidity in the container, enable or disable the sprinklers 164, set a schedule for activating the sprinklers 164, set or change a temperature for the HVAC unit 166, and/or the like.

In certain embodiments, the container 102 may include various sensors (not shown) for triggering different components of the container 102. For instance, the container may include motion sensors, proximity sensors, temperature sensors, moisture sensors, and/or the like that may trigger different actions. For example, the controller 102 may enable the interior lights 154 and/or interior cameras in response to a motion sensor detecting motion within the container 102, in response to the door 104 being opened or unlocked, and/or the like. Similarly, the controller 152 may enable the exterior lights 155 and/or video cameras 157 in response to motion sensors detecting motion outside of the container 102. Temperature sensors and/or moisture/humidity sensors may be used to trigger enabling/disabling the HVAC system 166 and/or enabling/disabling the moisture/humidity system 162. In this manner, the components are not persistently enabled or active, which conserves energy and power. In certain embodiments, the container 102 includes a bar code scanner, a radio-frequency identification scanner/reader/sensor, and/or the like to scan or detect items as they are placed in the container 102 and removed from the container 102.

In some embodiments, the container 102 includes a power system (not shown). The power system, in one embodiments, includes electrical components to power the various components of the container 102, e.g., the lights, cameras, moisture/humidity control system 162, HVAC system 166, controller 152, and/or the like. In certain embodiments, the power system includes hook-ups for a continuous power source, such as a power grid. In some embodiments, the power system includes a solar panel 158 that is configured to generate electricity using solar power. The generated electricity may be stored in one or more batteries (not shown), which may be used to power the components of the container 102. In this manner, the container 102 is self-contained such that it can be placed in a remote location without a connection to persistent power or other utilities.

In one embodiment, the container 102 includes a wireless signal receiver/transmitter 160 such as an antennae, satellite, and/or the like. For instance, the wireless signal receiver/transmitter 160 may be connected to a cellular network or other wireless network such that the controller 152 and/or other components of the container 102 can communicate remotely with other devices, e.g., so that an owner or manager of the container 102 can remotely manage the container's components.

In one embodiment, the container apparatus 204 is configured to receive a request from a user to unlock the door 104 to the container 102, verify that payment has been made for one or more items within the container 102, receive an unlock code to unlock the door 104 if payment has been verified, and then enable one or more security features (e.g., lights and cameras) within the container 102 to monitor the user removing items from the container 102. The container apparatus 204 ensures that the user only removes what he has paid for, and if the user removes items that were not paid for, or if there is other theft or vandalism performed, then container apparatus 204 can alert the owner/manager of the container 102, law enforcement authorities, and/or the like. In this manner, the container 204 can be remotely managed and monitored while allowing unsupervised access to the container 102. The container apparatus 204 is described in more detail below with reference to FIG. 3.

Figure 2:
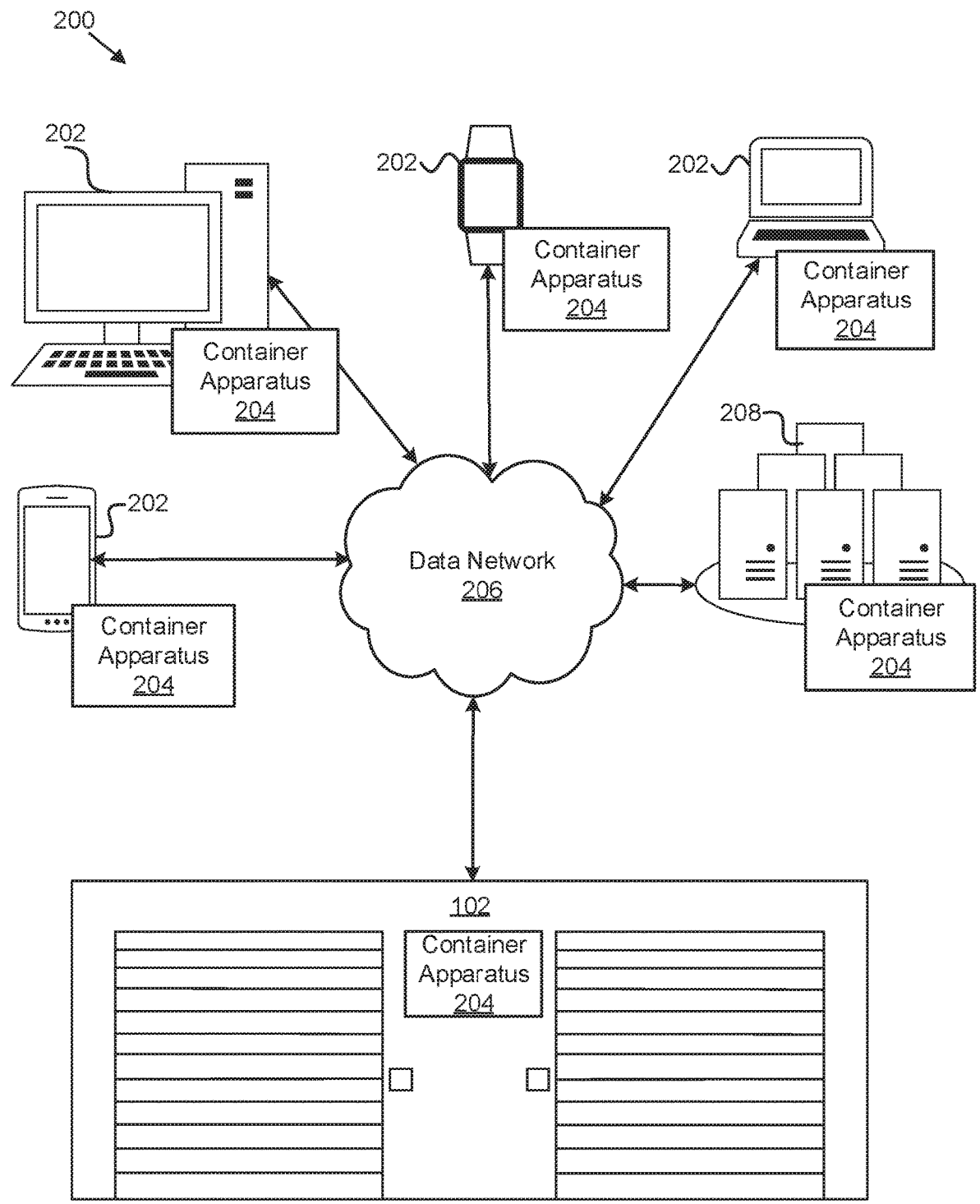
FIG. 2 is schematic block diagram illustrating one embodiment of a system for an automated container kiosk.

FIG. 2 is schematic block diagram illustrating one embodiment of a system 200 for an automated container kiosk. In one embodiment, the system 200 includes one or more information handling devices 202, one or more container apparatuses 204, one or more data networks 206, one or more servers 208, and one or more containers 102 as described above with reference to FIGS. 1A and 1B. In certain embodiments, even though a specific number of information handling devices 202, container apparatuses 204, data networks 206, servers 208, and containers 102 are depicted in FIG. 2, one of skill in the art will recognize, in light of this disclosure, that any number of information handling devices 202, container apparatuses 204, data networks 206, servers 208, and containers 102 may be included in the system 200.

In one embodiment, the system 200 includes one or more information handling devices 202. The information handling devices 202 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. The container 102 may comprise an information handling device 102 that acts as the controller 152 and/or executes an instance of a controller 152.

In certain embodiments, the information handling devices 202 are communicatively coupled to one or more other information handling devices 202 and/or to one or more servers 208 over a data network 206, described below. The information handling devices 202, in further embodiments, may include processors, processor cores, and/or the like that are configured to execute various programs, program code, applications, instructions, functions, and/or the like. For instance, the information handling device 202 may include applications, programs, code, instructions, interfaces, and/or the like for wirelessly communicating with a container 102 to control the various elements of the container 102 such as the lock for the door 104, the HVAC system 166, the moisture/humidity system 162, the interior 154 and exterior lights 155, the interior 156 and exterior cameras 157, and/or the like.

In various embodiments, the container apparatus 204, described above with reference to FIG. 1, may be embodied as a hardware appliance that can be installed or deployed on an information handling device 202, on a server 208, on a container 102, or elsewhere on the data network 206. In certain embodiments, the container apparatus 204 may include a hardware device such as a secure hardware dongle or other hardware appliance device (e.g., a set-top box, a network appliance, or the like) that attaches to a device such as a laptop computer, a server 208, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the container apparatus 204 may include a power interface, a wired and/or wireless network interface, a graphical interface that attaches to a display, and/or a semiconductor integrated circuit device as described below, configured to perform the functions described herein with regard to the container apparatus 204.

The container apparatus 204, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the container apparatus 204 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the container apparatus 204.

The semiconductor integrated circuit device or other hardware appliance of the container apparatus 204, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the container apparatus 204 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 206, in one embodiment, includes a digital communication network that transmits digital communications. The data network 206 may include a wireless network, such as a wireless cellular network, a local wireless network, such as a Wi-Fi network, a Bluetooth® network, a near-field communication ("NFC") network, an ad hoc network, and/or the like. The data network 206 may include a wide area network ("WAN"), a storage area network ("SAN"), a local area network ("LAN"), an optical fiber network, the internet, or other digital communication network. The data network 206 may include two or more networks. The data network 206 may include one or more servers, routers, switches, and/or other networking equipment. The data network 206 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 208, in one embodiment, may be embodied as blade servers, mainframe servers, tower servers, rack servers, and/or the like. The one or more servers 208 may be configured as mail servers, web servers, application servers, FTP servers, media servers, data servers, web servers, file servers, virtual servers, and/or the like. The one or more servers 208 may be communicatively coupled (e.g., networked) over a data network 206 to one or more information handling devices 202 and/or containers 102. For instance, a server 208 may be an intermediary between information handling devices 202 to facilitate sending and receiving electronic messages between the information handling devices 202 and the containers 102.

Figure 3:
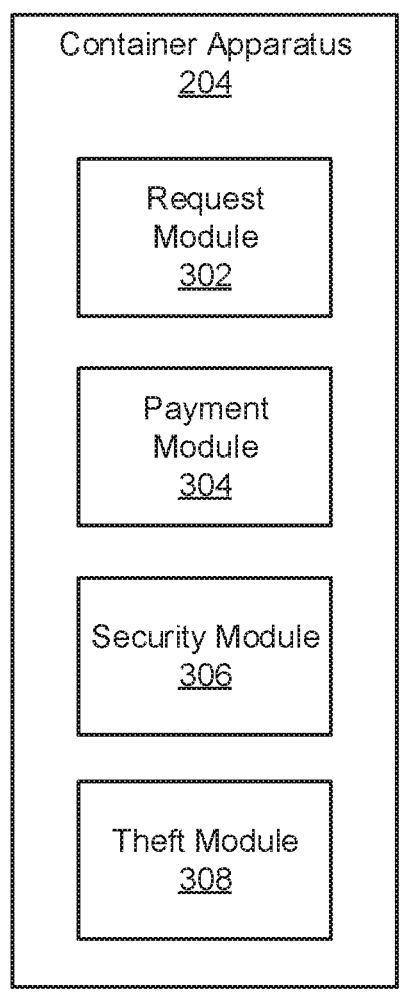
FIG. 3 is a schematic block diagram illustrating one embodiment of an apparatus for an automated container kiosk.

FIG. 3 is a schematic block diagram illustrating one embodiment of an apparatus 300 for an automated container kiosk. In one embodiment, the apparatus 300 includes an instance of a container apparatus 204. The container apparatus 204 may include one or more of a request module 302, a payment module 304, a security module 306, and a theft module 308, which are described in more detail below.

The request module 302, in one embodiment, is configured to receive a request over a data network 106 to unlock a door 104 of a container 102. As used herein, the request to unlock the door 104 may comprise a message, notification, signal, data packet, and/or another type of electronic communication that includes an indicator that the user is requesting that the door 104 be unlocked. In one embodiment, the request may be received from the container 102 itself. For instance, a user may interact with a kiosk at the container 102 (e.g., a digital or physical kiosk), with a smart lock at the container 102 (e.g., a button on the keypad for the lock), and/or the like. In some embodiments, the container 102 may include a dedicated button, switch, or the like that triggers an unlock request when pressed. In further embodiments, the request module 302 may receive a request to unlock the door 104 from a user's device, e.g., via a mobile application, a web page request, a phone call, a text message, an instant message, a social media post, and/or the like. One of skill in the art will recognize other electronic means for receiving a request to unlock the door 104 of the container 102 in light of this disclosure.

In such an embodiment, the request may be received at the controller 152 of the container 102 over a wired connection to the kiosk or keypad, over a short-range wireless connection (e.g., Bluetooth®, NFC, or the like) to the user's device, from a cloud or remote server 208 that receives the request from the user's device (e.g., via a website or social media post), and/or the like. The request may include a unique identifier for the user, one or more credentials for the user (e.g., a username, password, passphrase, keycode, or the like), a timestamp of the request (which the request module 302 may log), the location where the request came from (e.g., based on the user's IP address, GPS location, the keypad or kiosk being physically interacted with, or the like), and/or the like.

In certain embodiments, if the request module 302 receives a request from a location that is further from the container 102 than a predefined or threshold distance, the request may be denied, ignored, discarded, and/or the like. For example, if the request module 302 receives a request to unlock the door 104 from a location that is more than ten feet from the container 102, then the request may be ignored. Other threshold distances may be configured by the owner or manager of the container 102, including servicing unlock requests from any location regardless of the distance from the container 102.

The payment module 304, in one embodiment, is configured to determine whether one or more payment conditions is satisfied for one or more items 170 within the container 102. In certain embodiments, in response to receiving the unlock request, the payment module 304 checks the user's account (which may be accessible from a server 208 or other remote device or third-party device over the data network 106, and using the user's identifier, name, account number, credentials, and/or the like) to determine whether the user has paid for one or more items 170 within the container 102. A payment condition, as used herein, comprises a manner in which payment is provided for one or more items 170 within the container 102 and whether the full purchase price has been paid. The payment may be an online payment, an electronic payment, a credit/debit/gift card payment, a cash payment, a check payment, and/or the like.

In some embodiments, the payment module 304 receives payment from the user via the user's device, e.g., from a mobile application, a web page, a social media site, a text message, an automated voice payment system, a digital wallet (e.g., Venmo®), an online payment system (e.g., PayPal®), and/or the like. In further embodiments, the payment module 304 receives payment at a kiosk located at the container, e.g., a kiosk that allows the user to enter payment information (e.g., credit card information, digital payment information, etc.), swipe a credit/debit/gift card, insert cash, and/or the like.

In certain embodiments, the payment module 304, either on the user's device or at the container kiosk, receives a selection of items that the user wishes to purchase that are within the container 102. The payment module 304 may track inventory within the container 102 or receive inventory information from a server 208 or another device 202 that maintains inventory information for the container 102. The user can then use his device or the kiosk to select the items 170 he wants to purchase and provide payment information to checkout.

The security module 306, in one embodiment, in response to determining that the one or more payment conditions is satisfied, receives information for unlocking the door 104 to the container 102. For instance, the request module 302 may provide the unlock request to a server 208 or other device that stores the user's account and payment information over the data network 106 and may receive the unlock information for unlock the door 104 to the container 102 if the payment module 304 determines that the user has paid for one or more items in the container 102.

The unlock information may include a code, key, phrase, or the like that the security module 306 receives at the user's device and that can be entered on a keypad to actuate the locking mechanism 106. In some embodiments where the locking mechanism 106 is a smart lock, the unlock information includes a code, key, phrase, password, or the like for wirelessly connecting the user's device to the smart lock and cause the smart lock to actuate. In some embodiments, the unlock information comprises a one-time-use unlock code such that the code is regenerated, renewed, recreated, or otherwise not repeated for each use, e.g., the unlock code is invalidated once it is used, invalidated after a period of time, and/or the like. In various embodiments, the security module 306 at the container 102 may receive the unlock information and automatically unlock and/or open the door 104 without requiring the user to enter the unlock information or manually actuate the locking mechanism 106.

Furthermore, in certain embodiments, the security module 306 automatically closes the door after detecting a period of time without activity within the container 102. For instance, if sensors within the container 102, such as motion sensors, do not detect activity within the container for a predetermined period of time, e.g., 5 minutes, 10 minutes, etc., the security module 306 may automatically close any open doors 104 or other entryways into the container 102 to prevent unauthorized access into the container 102 and theft of items 170 within the container 102.

In further embodiments, in response to the door 104 being unlocked, in response to the door 104 being opened, and/or the like, the security module 306 enables one or more security measures within the container 102 and/or outside the container 102 for monitoring activity within and without the container 102. For example, the security module 306 may receive a signal that the locking mechanism 106 has been unlocked (e.g., from the smart lock, from a sensor coupled to the locking mechanism, or the like) and may enable interior lights 154 and cameras 156 within the container 102 to illuminate, monitor, track, and capture activity within the container 102 such as the user taking the items 170 that were purchased from the container 102. The security module 306 may further enable exterior lights 155 and cameras 157 to illuminate, monitor, track, and capture activity around the container 102. In this manner, the security measures may only be enabled when there is activity around and within the container 102 (to conserver power) and may capture mischievous and/or unauthorized activities.

In certain embodiments, the security module 306 further sends a notification to an owner, manager, or other person associated with the container 102 to notify them that a customer is within the container 102. In such an embodiment, the security module 306 may also provide a live video feed (e.g., as a link to the feed, as a push notification for a mobile application, or the like) of the inside/outside of the container 102 to the person's device so that the person can monitor the customer's activities in real-time. As described above, the lights 154/155 and/or cameras 156/157 may be activated, turned on, powered on, or the like in response to the locking mechanism 106 being unlocked, in response to the door 104 being opened, in response to motion being detected within the container 102, and/or the like. The security module 306 may also provide an audio feed of the activities and allow the owner or manager to remotely speak to the customer using the owner's or manager's device (e.g., provided the container 102 includes microphones and speakers). The security module 306 may store images, video, and/or audio of the customer's activities at a server 208 or another device.

The theft module 308, in one embodiment, is configured to detect one or more items 170 that are taken from the container 102 that have not been purchased. In certain embodiments, if the theft module 308 detects that items 170 are being stolen from the container 102, the theft module 308 sends an alarm notification to an owner/manager of the container 102, to a law enforcement agency, and/or the like.

In certain embodiments, the theft module 308 detects the one or more items 170 that are taken from the container 102 that have not been purchased by processing images of items 170 taken from the container 102. For instance, the theft module 308 may capture images of items 170 using the cameras 154/155, e.g., as the items 170 pass through the doorway, and process the images to determine whether the items 170 correspond to items 170 that the customer has purchased, e.g., on the customer's order or receipt. The theft module 308 may utilize existing image processing methods at the controller 152 or at a remote server 208 to identify the items 170 in the images.

In one embodiment, the theft module 308 detects the one or more items 170 that are taken from the container 102 that have not been purchased by scanning items 170 as they are removed from the container 102. For instance, the container may include a barcode scanner, an RFID reader, or other tag/identification detector that reads identification information from an item 170 when the item 170 is removed from the container. The theft module 308 may cross-reference the identified items 170 with the customer's order or receipt to determine whether the customer purchased the items 170 that are being removed from the container 102.

In further embodiments, the theft module 308 detects the one or more items 170 that are taken from the container 102 that have not been purchased by using one or more weight sensors to determine the weight of the container 102 before and after items 170 are removed from the container 102. In such an embodiment, an actual or estimated weight of each item 170 may be determined and logged. The theft module 308 may then determine the weight of an item 170 as it is removed from the container 102 by determining the difference between the weight of the container 102 before and after the item 107 is removed from the container.

The theft module 308 may use the determined weight of the item 170 to lookup an item 170 in the container 102 that has the determined weight (e.g., using the weight as an index into a lookup table, or the like) and cross-reference the identified items 170 with the customer's order or receipt to determine whether the customer purchased the items 170 that are being removed from the container 102. In other embodiments, the theft module 308 may use information from weight sensors placed on pallets, tables, shelfs, crates, and/or the like to determine the weight of items 170 that are removed from the container 102.

Figure 4:
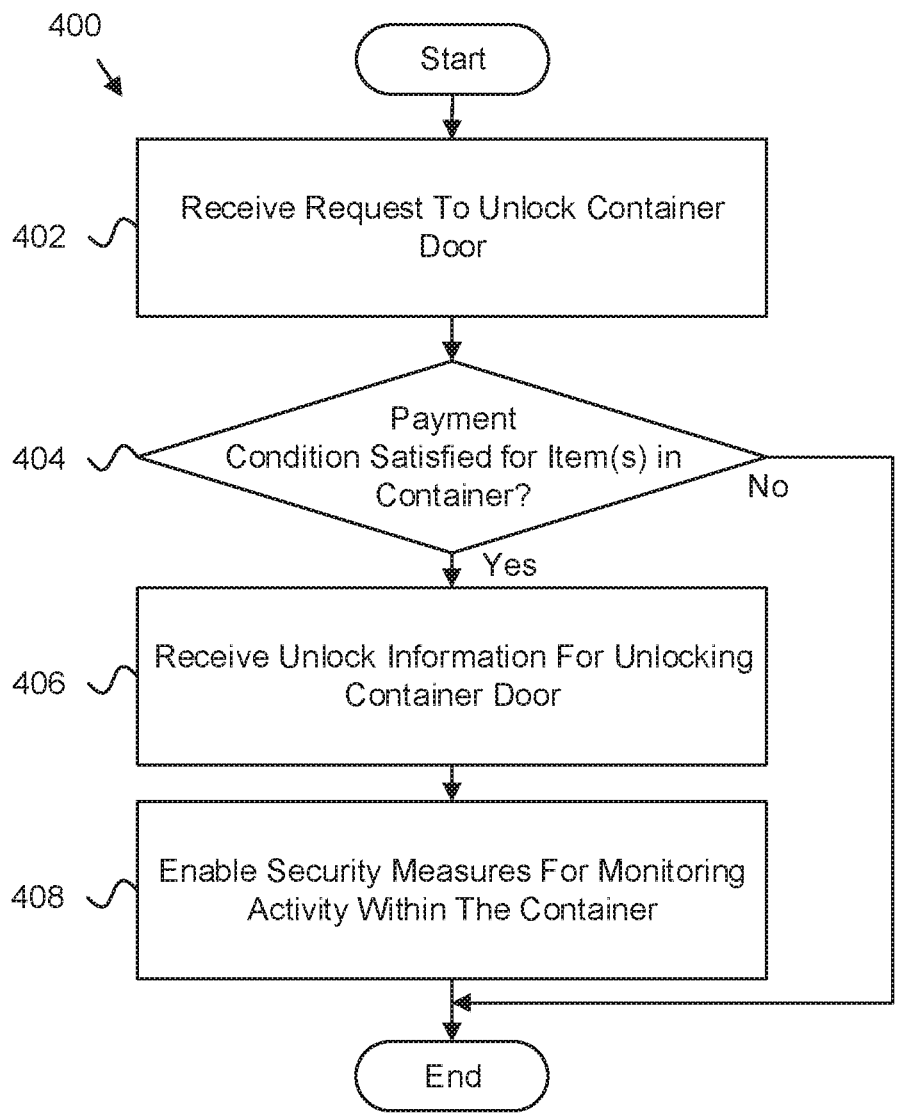
FIG. 4 is a schematic flow-chart diagram illustrating one embodiment of a method for an automated container kiosk.

FIG. 4 is a schematic flow-chart diagram illustrating one embodiment of a method 400 for an automated container kiosk. In one embodiment, the method 400 begins and receives 402 a request over a data network 106 to unlock the door 104 of a container 102. In further embodiments, if the method 400 determines 404 that one or more payment conditions is not satisfied for one or more items 170 within the container 102, the method 400 ends.

Otherwise, the method 400 receives 406 unlock information for unlocking the door 104 of the container 102. The method 400, in various embodiments, enables 408 one or more security measures for monitoring activity within the container 102, and the method 400 ends. In certain embodiments, the request module 302, the payment module 304, the security module 306, and the theft module 308 perform the various steps of the method 400.

Figure 5A:
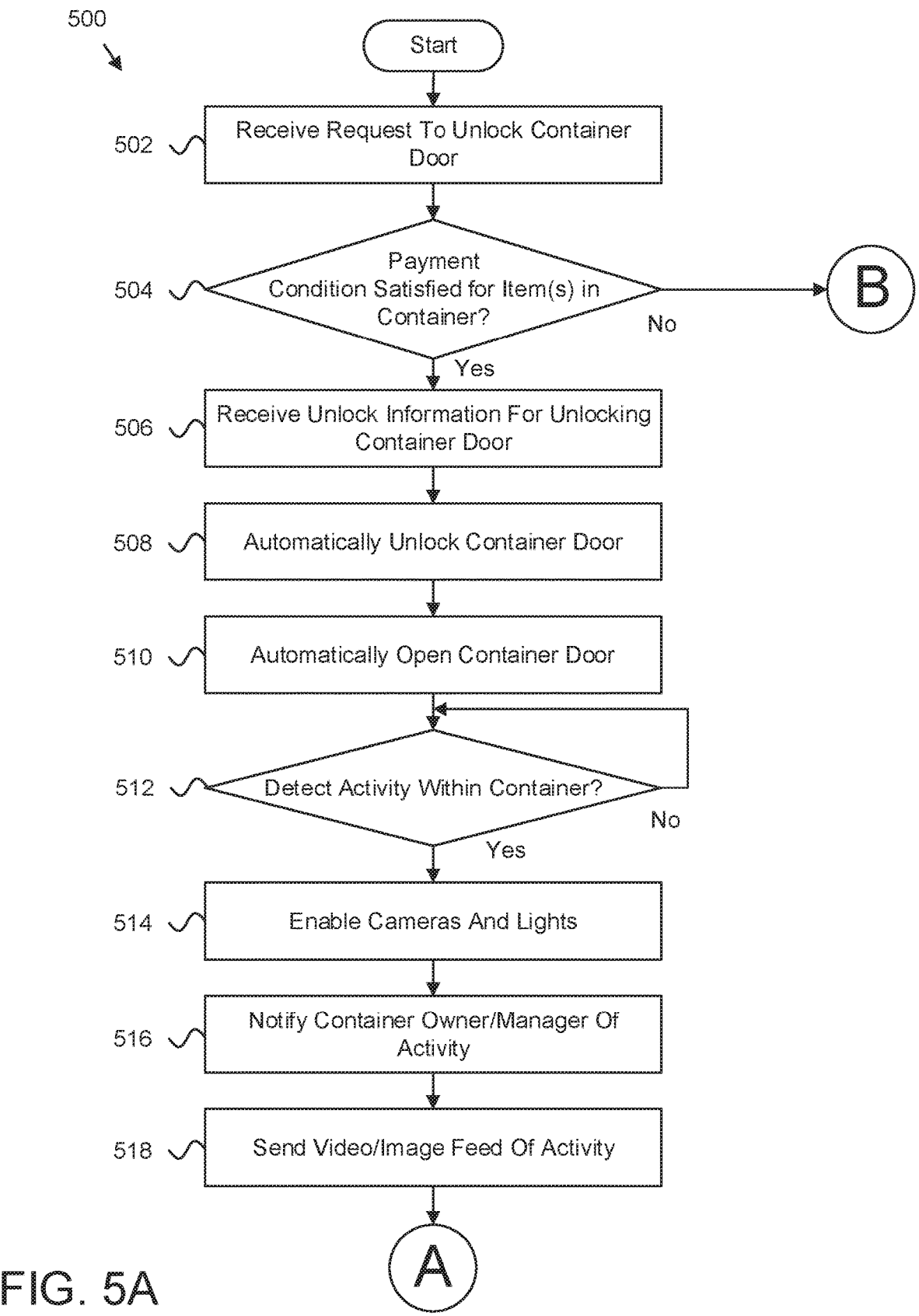
FIGS. 5A and 5B are a schematic flow-chart diagram illustrating one embodiment of another method for an automated container kiosk.
Figure 5B:
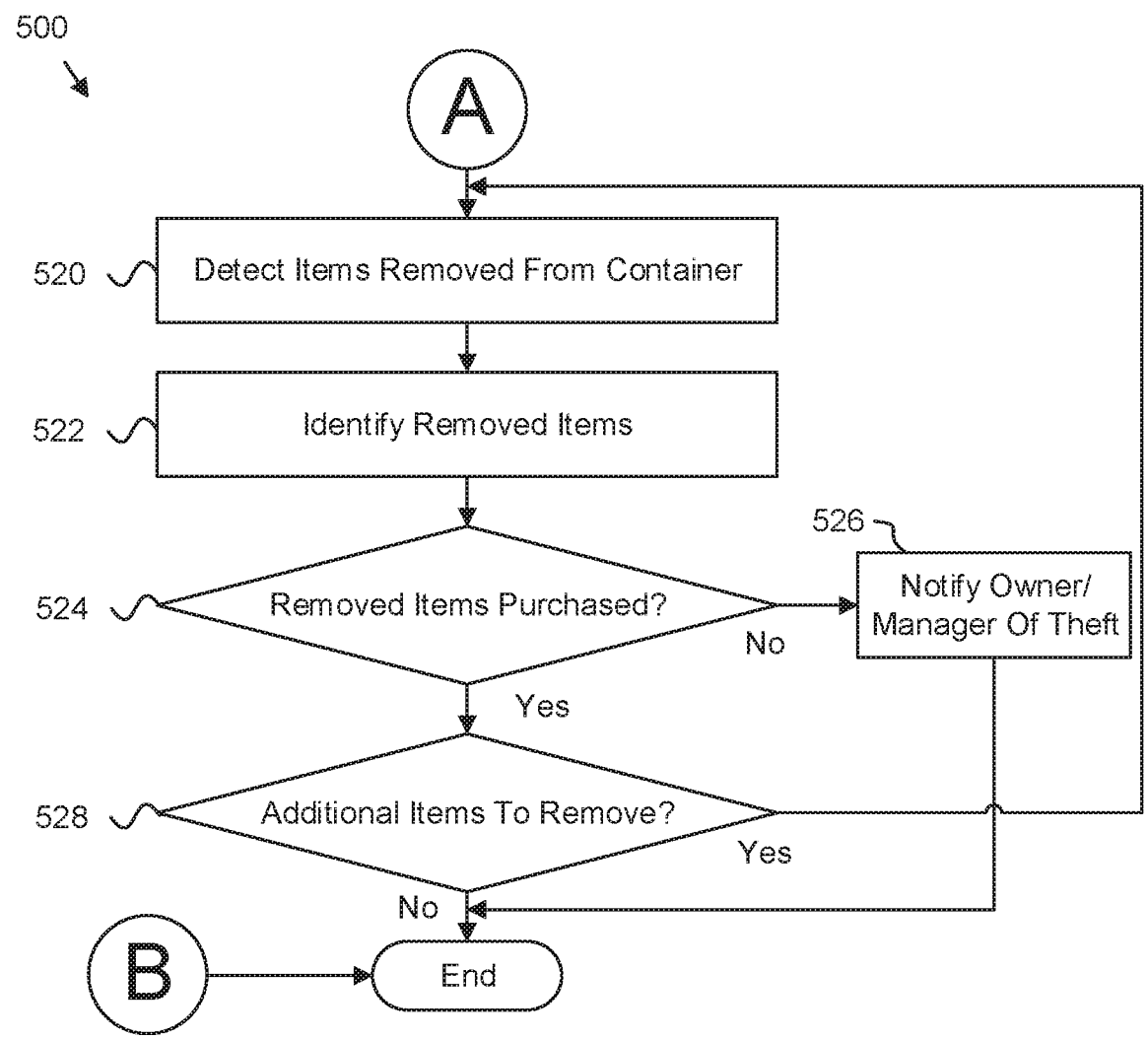

FIGS. 5A and 5B depict a schematic flow-chart diagram illustrating one embodiment of a method 500 for an automated container kiosk. In one embodiment, the method 500 begins and receives 502 a request over a data network 106 to unlock the door 104 of a container 102. In further embodiments, if the method 500 determines 504 that one or more payment conditions is not satisfied for one or more items 170 within the container 102, the method 400 ends (following 'B' to FIG. 5B).

Otherwise, in one embodiment, the method 500 receives 506 unlock information for unlocking the container door 104. In some embodiments, the method 500 automatically unlocks 508 the container door 104 using the unlock information and automatically opens 510 the container door 104. If the method 500 determines 512 that there is no activity within the container 102, the method 500 continues to monitor for activity within the container 102.

Otherwise, the method 500 enables 514 lights 154/155 and/or cameras 156/157 within the container 102 and notifies 516 the container owner/manager of the activity within the container 102. The method 500, in certain embodiments, sends 518 a live video feed of the activity that is captured using the cameras 156/157 to the owner/manager of the container 102.

Following 'A' to FIG. 5B, the method 500 detects 520 items 170 that are removed from the container 102 and identifies 522 the removed items 170. In certain embodiments, if the method 500 determines 524 that the removed items 170 are not items 170 that the customer has purchased, the method 500 notifies 526 the owner/manager of the container 102 of the possible theft, and the method 500 ends.

Otherwise, if the method 500 determines 528 that there are more items 170 to be removed from the container 102 that the customer has purchased, the method 500 continues to detect 520 items 170 that are removed from the container 102. Otherwise, the method 500 ends. In certain embodiments, the request module 302, the payment module 304, the security module 306, and the theft module 308 perform the various steps of the method 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a request module configured to receive a request over a data network to unlock a door of a container;
   a payment module configured to determine whether one or more payment conditions is satisfied for one or more items within the container; and
   a security module configured to, in response to determining that the one or more payment conditions is satisfied:
      receive unlock information for unlocking the door of the container, the unlock information comprising a one-time use unlock code for a digital lock that is used to lock the door, the one-time use code not valid after it is used to unlock the door; and
      in response to unlocking the door of the container, enable one or more security measures for monitoring activity within an interior of the container, the one or more security measures comprising turning on one or more cameras and lights that are located within the interior of the container to capture one or more of images and videos of a user while the user is within the interior of the container; and
   a climate control system, the climate control system configured to maintain one or more climate settings within the container, the climate settings determined based on a type of items within the container,
   wherein the modules comprise one or more of hardware circuits, programmable hardware devices, and a processor executing code.

2. The apparatus of claim 1, wherein the security module is further configured to enable one or more cameras and lights located on an external surface of the container in response to detecting a user's proximity to the container.

3. The apparatus of claim 1, wherein the security module is further configured to one or more of send a notification and provide a live video feed of an interior of the container in response to a user accessing the interior of the container.

4. The apparatus of claim 1, wherein the security module is further configured to:
   automatically unlock and open the door in response to receiving the unlock information for unlocking the door; and
   automatically close the door after detecting a period of time without activity within the container.

5. The apparatus of claim 1, further comprising a theft module configured to detect one or more items that are taken from the container that have not been purchased.

6. The apparatus of claim 5, wherein the theft module detects the one or more items that are taken from the container that have not been purchased by one or more of processing images of items taken from the container, scanning items as they are removed from the container, and using one or more weight sensors to determine the weight of the container before and after the items are removed from the container.

7. The apparatus of claim 5, wherein the theft module is further configured to send an alarm in response to detecting the one or more items that are taken from the container that have not been purchased.

8. The apparatus of claim 1, wherein the payment module receives payment for one or more items within the container via one or more of a mobile application, an automated phone payment system, and a kiosk located at the container.

9. The apparatus of claim 1, wherein the unlock information comprises an unlock code for a digital lock that is used to lock the door.

10. The apparatus of claim 9, wherein the security module is further configured to automatically unlock the door using the unlock code in response to receiving the unlock code.

11. A container, comprising:
    a power system, the power system comprising one or more solar panels and batteries for powering different components of the container;
    a door, the door operably coupled to the container and comprising a locking mechanism configured to selectively allow unsupervised access to an inside of the container; and
    a controller, the controller configured to:
       receive a request over a data network to unlock the door of the container;
       determine whether one or more payment conditions is satisfied for one or more items within the container; and
       in response to determining that the one or more payment conditions is satisfied:
          receive unlock information for unlocking the locking mechanism, the unlock information comprising a one-time use unlock code for a digital lock that is used to lock the door, the one-time use code not valid after it is used to unlock the door; and
          in response to unlocking the door of the container, enable one or more security measures for monitoring activity within an interior of the container, the one or more security measures comprising turning on one or more cameras and lights that are located within the interior of the container to capture one or more of images and videos of a user while the user is within the interior of the container; and
    a climate control system, the climate control system configured to communicate with the controller to maintain one or more climate settings within the container, the climate settings determined based on a type of items within the container.

12. The container of claim 11, wherein the climate control system comprises a heating, ventilation, and air conditioning ("HVAC") system for controlling a temperature of the interior of the container, the temperature determined based on the type of items within the container.

13. The container of claim 11, wherein the climate control system further comprises one or more moisture components for generating humidity and providing moisture to one or items within the container.

14. The container of claim 11, further comprising a wireless communication system, the wireless communication system comprising one or more of satellite components, cellular components, and Wi-Fi components for wirelessly communicating information to a remote device.

15. The container of claim 11, wherein the one or more items within the container comprise vegetation, the vegetation comprising one or more of plants, sod, flowers, bushes, and trees.

16. A method, comprising:
    receiving a request over a data network to unlock a door of a container;
    determining whether one or more payment conditions is satisfied for one or more items within the container;
    in response to determining that the one or more payment conditions is satisfied:
       receiving unlock information for unlocking the door of the container, the unlock information comprising a one-time use unlock code for a digital lock that is used to lock the door, the one-time use code not valid after it is used to unlock the door; and in response to unlocking the door of the container, enabling one or more security measures for monitoring activity within an interior of the container, the one or more security measures comprising turning on one or more cameras and lights that are located within the interior of the container to capture one or more of images and videos of a user while the user is within the interior of the container; and maintaining one or more climate settings within the container using a climate control system, the climate settings determined based on a type of items within the container.

\* \* \* \* \*